US012669741B2

(12) United States Patent
Zeng

(10) Patent No.: US 12,669,741 B2
(45) Date of Patent: Jun. 30, 2026

(54) PHOTOGRAPHIC AND VIDEO LIGHT

(71) Applicant: GODOX PHOTO EQUIPMENT CO., LTD., Shenzhen (CN)

(72) Inventor: Weijun Zeng, Shenzhen (CN)

(73) Assignee: GODOX PHOTO EQUIPMENT CO., LTD., Shenzhen (CN)

( * ) Notice: Subject to any disclaimer, the term of this patent is extended or adjusted under 35 U.S.C. 154(b) by 0 days.

(21) Appl. No.: 19/265,370

(22) Filed: Jul. 10, 2025

(65) Prior Publication Data

US 2025/0341761 A1     Nov. 6, 2025

Related U.S. Application Data

(63) Continuation of application No. PCT/CN2024/130936, filed on Nov. 8, 2024.

(30) Foreign Application Priority Data

| | | |
|---|---|---|
| Nov. 10, 2023 | (CN) | 202323045064.7 |
| Nov. 10, 2023 | (CN) | 202323047844.5 |
| Nov. 10, 2023 | (CN) | 202323055231.6 |
| Nov. 10, 2023 | (CN) | 202323067355.6 |
| Nov. 10, 2023 | (CN) | 202323076054.X |

(51) Int. Cl.
*G03B 15/03* (2021.01)

(52) U.S. Cl.
CPC .................................. *G03B 15/03* (2013.01)

(58) Field of Classification Search
CPC ..... F21L 4/00; F21L 4/04; F21L 14/02; F21L 4/08; F21V 15/01; F21V 14/025;
(Continued)

(56) References Cited

U.S. PATENT DOCUMENTS

| | | | | |
|---|---|---|---|---|
| 5,746,495 A | * | 5/1998 | Klamm | F21V 29/67 |
| | | | | 362/183 |
| 11,732,847 B2 | * | 8/2023 | Hopkins | F21V 21/30 |
| | | | | 362/618 |

FOREIGN PATENT DOCUMENTS

| | | |
|---|---|---|
| CN | 204254311 | 4/2015 |
| CN | 209013136 | 6/2019 |
(Continued)

OTHER PUBLICATIONS

WIPO, International Search Report for PCT/CN2024/130936, Dec. 9, 2024.

*Primary Examiner* — William J Carter
(74) *Attorney, Agent, or Firm* — Hodgson Russ LLP

(57) ABSTRACT

A photographic and video light includes a light head module, an optical module and a power supply module, the light head module includes a first housing and a light source assembly, one end of the first housing being an open end, the other end of the first housing being a mounting end; the optical module comprises a second housing and a light-effect lens, the second housing being mounted at the opening end, a light inlet and a light outlet being respectively provided at two ends of the second housing; and the power supply module comprises a third housing, with an end of the third housing being detachably connected to the mounting end, and the power supply module supplies power to the light source assembly, wherein the first housing, the second housing and the third housing constitute the complete housing of the photographic and video light.

19 Claims, 16 Drawing Sheets

(58) Field of Classification Search
CPC ............... F21V 23/0414; F21V 21/145; F21V
21/0885; F21V 21/406; F21V 23/009;
F21S 9/02; G03B 15/03
See application file for complete search history.

(56) References Cited

FOREIGN PATENT DOCUMENTS

| | | |
|---|---|---|
| CN | 210199463 | 3/2020 |
| CN | 213394797 | 6/2021 |
| CN | 220962095 | 5/2024 |
| CN | 221197307 | 6/2024 |
| CN | 221326907 | 7/2024 |
| CN | 221326908 | 7/2024 |
| CN | 221351915 | 7/2024 |

* cited by examiner

PHOTOGRAPHIC AND VIDEO LIGHT

CROSS-REFERENCE TO RELATED APPLICATIONS

The present application is a continuation of International Application No. PCT/CN2024/130936, filed on Nov. 8, 2024, which claims priority to Chinese Patent Application No. 202323045064.7, filed on Nov. 10, 2023, Chinese Patent Application No. 202323076054.X, filed on Nov. 10, 2023, Chinese Patent Application No. 202323067355.6, filed on Nov. 10, 2023, Chinese Patent Application No. 202323055231.6, filed on Nov. 10, 2023, and Chinese Patent Application No. 202323047844.5, filed on Nov. 10, 2023. The entire disclosures of the above-identified applications are hereby incorporated herein by reference.

TECHNICAL FIELD

The present application relates to the technical field of photographic and video equipment, particularly to a photographic and video light.

BACKGROUND

In today's society with advanced network technology, online live streaming, short videos, online photo sharing and other methods have become common online interaction methods for people. In order to obtain better videos or photos, people often need to use photographic and video lights for fill light when shooting videos, taking photos or conducting online live broadcasts.

Nowadays, the places where people shoot videos, take photos or conduct online live broadcasts are no longer limited to indoors, so it is necessary to carry photographic and video lights outdoors to meet the needs of users in various shooting scenarios. However, the existing photographic and video lights have many assemblies, large overall volume and occupy a large space, which is not convenient for users to carry and transport when going out, affecting the user experience.

SUMMARY

The purpose of the present application is to solve the technical problem that the overall volume of the photographic and video light is larger, which is inconvenient for users to carry and transport, and affects the user experience.

To solve the above technical problems, the present application provides a photographic and video light, which includes:

a light head module, comprising a first housing and a light source assembly, wherein an end of the first housing is an open end, and an end of the first housing opposite to the open end is set as an installation end, the light source assembly is provided in the first housing, and light emitted by the light source assembly is emitted from the open end of the first housing;

an optical module, comprising a second housing and a light effect lens provided inside the second housing, wherein the second housing is provided at the open end of the first housing, two ends of the second housing are a light inlet and a light outlet respectively, the light emitted by the light source assembly enters the second housing from the light inlet and is emitted from the light outlet through the light effect lens; and a power supply module, comprising a third housing, wherein an end of the third housing is detachably connected to an installation end of the first housing, and when an end of the third housing is docked with the installation end of the light head module, the power supply module is electrically connected to the light head module for supplying power to the light source assembly, and the first housing, the second housing, and the third housing form a complete housing of the photographic and video light.

DETAILED DESCRIPTION OF THE EMBODIMENTS

Figure 1:
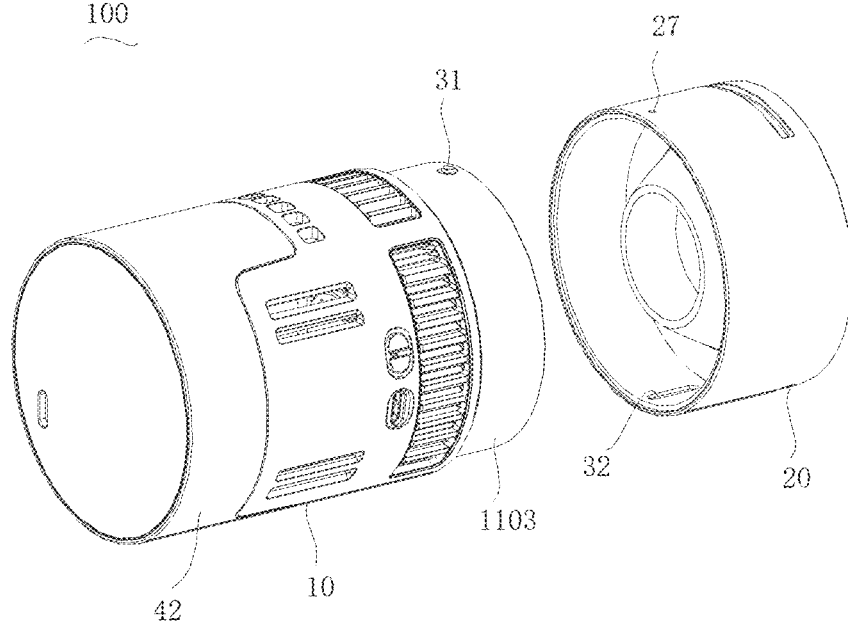
FIG. 1 is a three-dimensional structural schematic view of a light head module and an optical module of a photographic and video light of the present application during disassembly.
Figure 2:
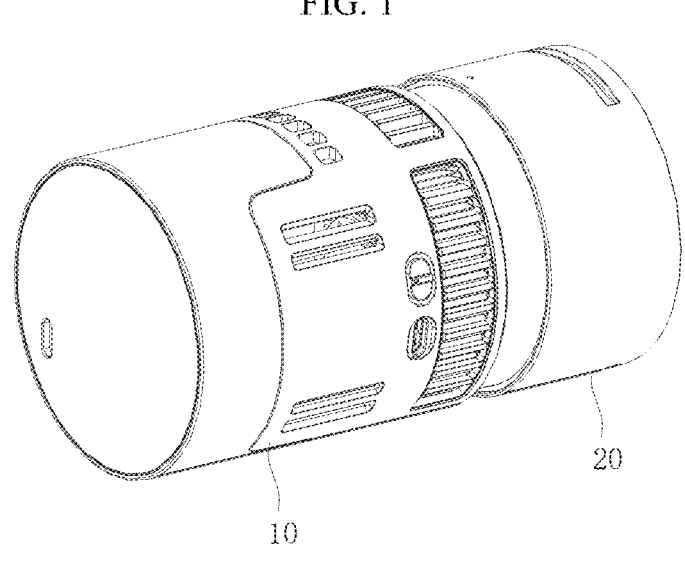
FIG. 2 is a three-dimensional structural schematic view of the light head module and the optical module in FIG. 1 during connection.
Figure 3:
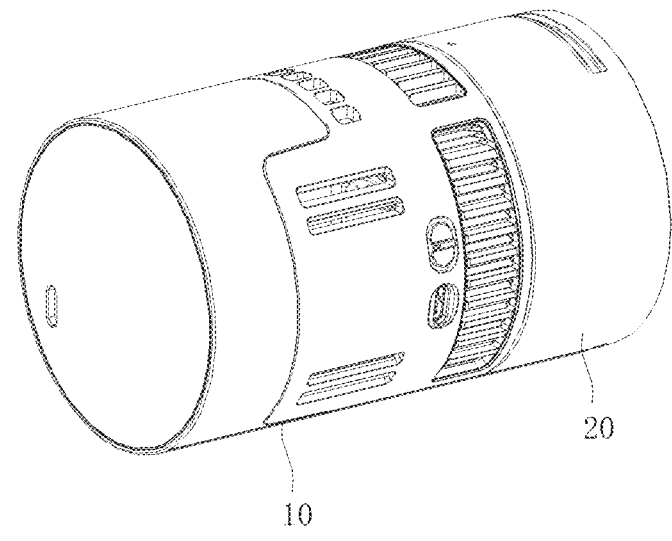
FIG. 3 is another three-dimensional structural schematic view of the light head module and the optical module in FIG. 1 during connection.

A typical embodiment demonstrating the features and advantages of the present application will be described in detail below. It should be understood that the present application is capable of various changes in different embodiments, all without departing from the scope of the present application, and the descriptions and drawings herein are essentially for illustrative purposes rather than to limit the present application.

In the description of the present application, it should be understood that in the embodiments shown in the drawings, indications of directions or positional relationships (such as up, down, left, right, front, and rear, etc.) are only for the convenience of describing the present application and simplifying the description, rather than indicating or implying that the referred device or element must have a specific orientation, be constructed, and operate in a specific orientation. When these elements are in the positions shown in the drawings, these descriptions are appropriate. If the description of the positions of these elements changes, the indications of these directions shall also change accordingly.

Furthermore, the terms "first" and "second" are only used for descriptive purposes and cannot be interpreted as indicating or implying relative importance or implicitly specifying the quantity of the indicated technical features. Thus, a feature defined with "first" or "second" may explicitly or implicitly include one or more of such features. In the description of this application, "a plurality of" means two or more, unless specifically and clearly defined otherwise.

Figure 15:
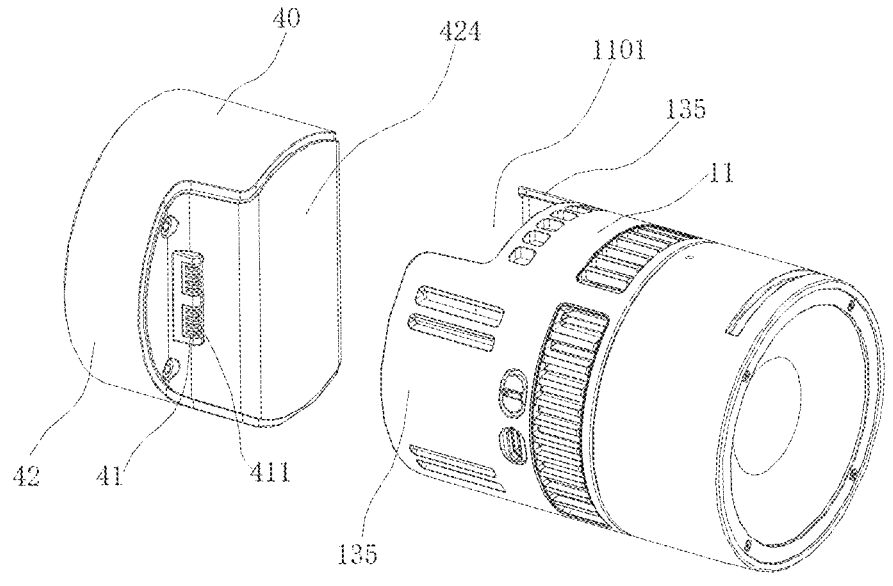
FIG. 15 is an exploded view of the photographic and video light.

Please refer to FIG. 1 and FIG. 15, this embodiment provides a photographic and video light 100, which includes a light head module 10, an optical module 20 detachably connected to the light head module 10, and a power supply module 40 detachably connected to the light head module 10. In practical use, the photographic and video light 100 can be disassembled into three parts: the light head module 10, the power supply module 40, and the optical module 20 to reduce the overall volume of the photographic and video light 100, thereby facilitating the transportation and carrying of the photographic and video light 100 by users.

Please refer to FIGS. 1 to 6, the light head module 10 of this embodiment includes a first housing 11 and a light source assembly 13. An end of the first housing 11 is an open end 1102. The light source assembly 13 is provided inside the first housing 11, and the light emitted by the light source assembly 13 can be emitted from the open end 1102 of the first housing 11.

The optical module 20 of this embodiment includes a second housing 21 and a light effect lens 22 provided inside the second housing 21. Both ends of the second housing 21 are open to form a light inlet 25 and a light outlet 26.

An end of the second housing 21 provided with the light inlet 25 is detachably connected to the open end 1102 of the first housing 11, so that the first housing 11 is detachably connected to the second housing 21, thus the optical module 20 is detachably connected to the light head module 10, such that users can replace different optical modules 20 according to different environments.

It should be understood that there are various types of light effect lenses 22 in this embodiment, and each type of light effect lens 22 can produce different light effects. For example, some light effect lenses 22 have different refractive indices, some have different softness, and some have different light transmittance, etc. When the user needs the photographic and video light 100 to emit a certain light effect, the optical module 20 with the corresponding light effect can be replaced to enrich the product functions and facilitate the user's use in different environments.

Figure 4:
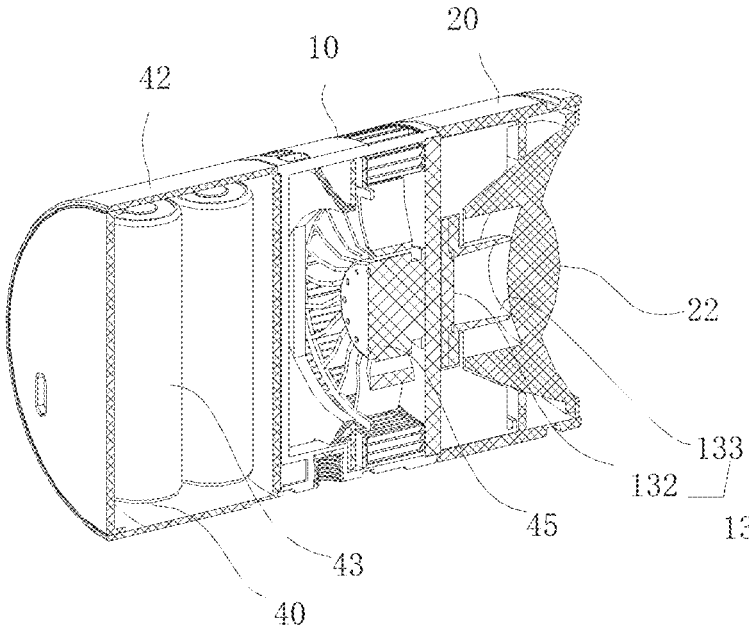
FIG. 4 is a sectional three-dimensional schematic view of the photographic and video light in FIG. 3.
Figure 6:
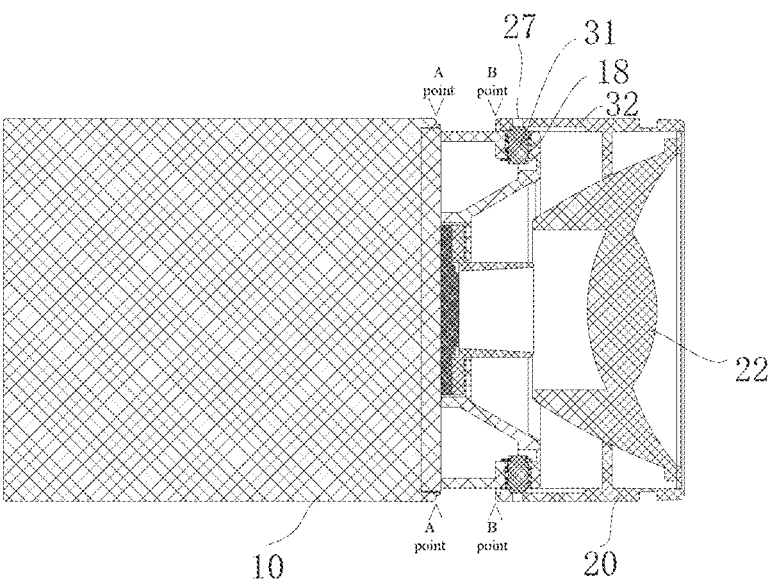
FIG. 6 is a sectional structural schematic view of the photographic and video light in FIG. 2.

Please refer to FIGS. 4 and 6, in this embodiment, the light source assembly 13 includes a light source housing 131, and a Light-Emitting Diode (LED) light source 132 and a light-mixing cavity 133 provided inside the light source housing 131. An end of the light source housing 131 is open, and the light emitted by the LED light source 132 can be emitted from the open end. The light-mixing cavity 133 is provided corresponding to the LED light source 132, and can enhance the light-mixing effect, thereby optimizing the lighting effect of the photographic and video light 100.

The light-mixing cavity 133 includes a cavity 1331 with opens at both ends. The cavity 1331 is provided corresponding to the light effect lens 22 in the second housing 21, so that the light emitted by the light source is mixed through the cavity 1331 and then emitted from the light effect lens 22.

Specifically, the light-mixing cavity 133 is provided inside the first housing 11, and the cavity 1331 formed by the light-mixing cavity 133 is directly opposite to the light effect lens 22. The light source is an LED light panel fixed on a rear side of the light-mixing cavity 133, so that the light emitted from the cavity 1331 can all enter the light effect lens 22.

In this embodiment, an annular light effect lens avoidance position 23 is formed between an outer side of the light-mixing cavity 133 and the first housing 11, which can accommodate part of the light effect lens 22. A rear end of the light effect lens 22 is also provided with an inwardly recessed light-mixing cavity avoidance position 28 for the light-mixing cavity 133 to enter. This setting allows part of the light effect lens 22 to be accommodated in the light effect lens avoidance position 23 and the light-mixing cavity 133 to be accommodated in the light-mixing cavity avoidance position 28 when the second housing 21 is connected to the first housing 11, so as to shorten the overall length of the photographic and video light 100 and facilitate the miniaturization of the photographic and video light 100.

Figure 5:
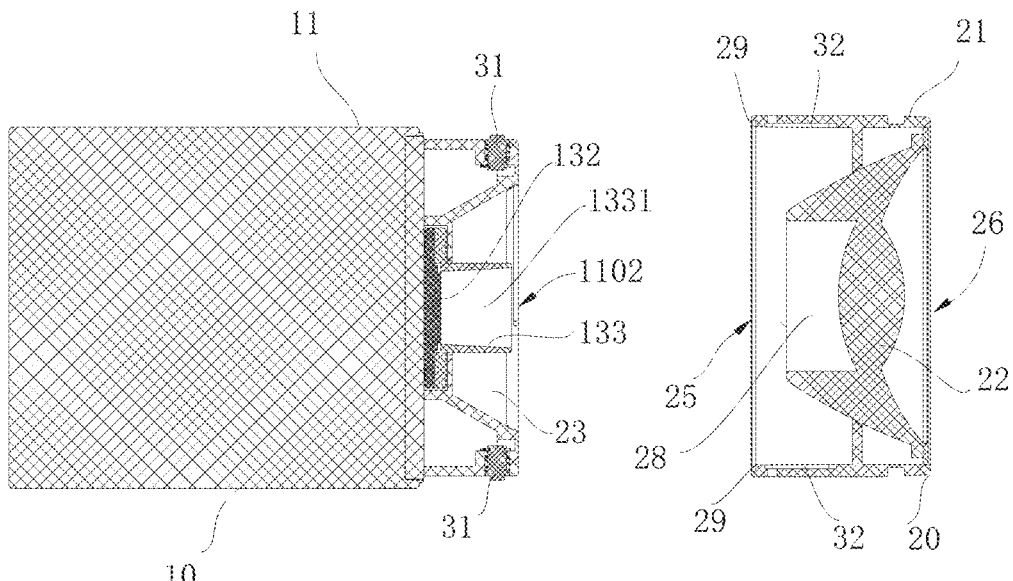
FIG. 5 is a sectional structural schematic view of the light head module and the optical module in FIG. 1 during disassembly.

Please refer to FIGS. 4 and 5, in some embodiments, the photographic and video light 100 further includes a heat dissipation member 45. The third housing 42 is detachably connected to the first housing 11, and the light head module 10 is electrically connected to the power supply module 40. The heat dissipation member 45 is provided inside the first housing 11 and located behind the light source assembly 13, and the heat dissipation member 45 is used to generate a heat dissipation airflow to dissipate heat from the light source assembly 13.

Figure 10:
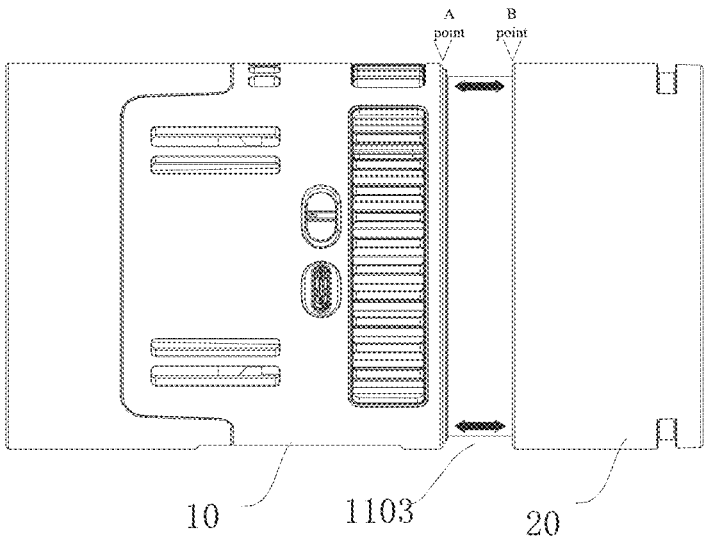
FIG. 10 is a structural schematic view of the light head module and the optical module of the photographic and video light of the present application in an extended state.
Figure 11:
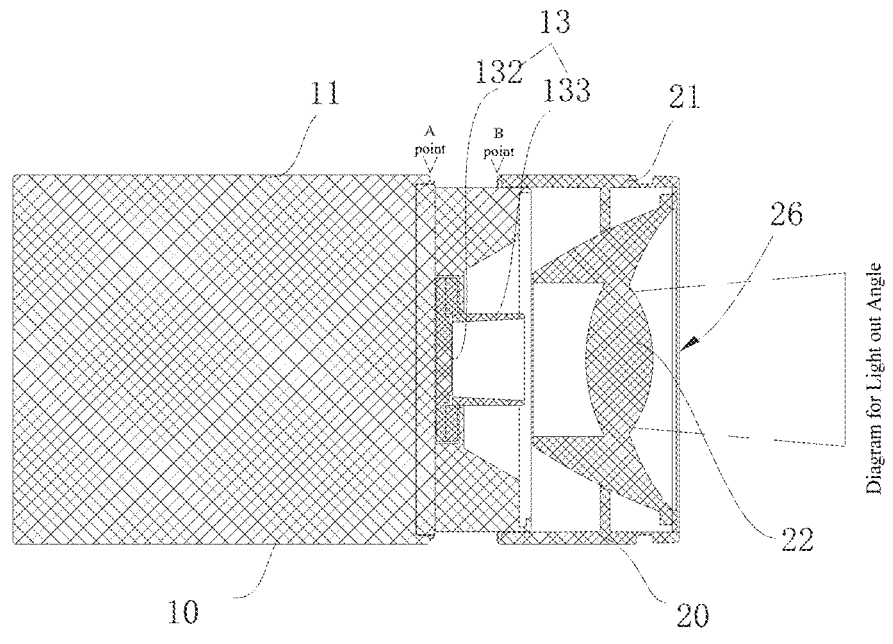
FIG. 11 is a sectional schematic view of the photographic and video light in FIG. 10.

Please refer to FIGS. 1 and 10, in this embodiment, the open end 1102 of the first housing 11 is provided with a recessed position 1103, and an end of the second housing 21 provided with the light inlet 25 can be sleeved on the recessed position 1103, so that the outer side of the first housing 11 is flush with the outer side of the second housing 21.

Specifically, both the first housing 11 and the second housing 21 are cylindrical, and the outer side of the open end 1102 of the first housing 11 is recessed inward to form the recessed position 1103. An end of the second housing 21 with the light inlet 25 can be sleeved on the recessed position 1103, and the second housing 21 is connected through the recessed position 1103, so that the first housing 11 and the second housing 21 can be combined to form a complete cylinder, which has a beautiful appearance, a regular shape, and no outward protrusion, facilitating carrying and storage.

Figures 7, 8:
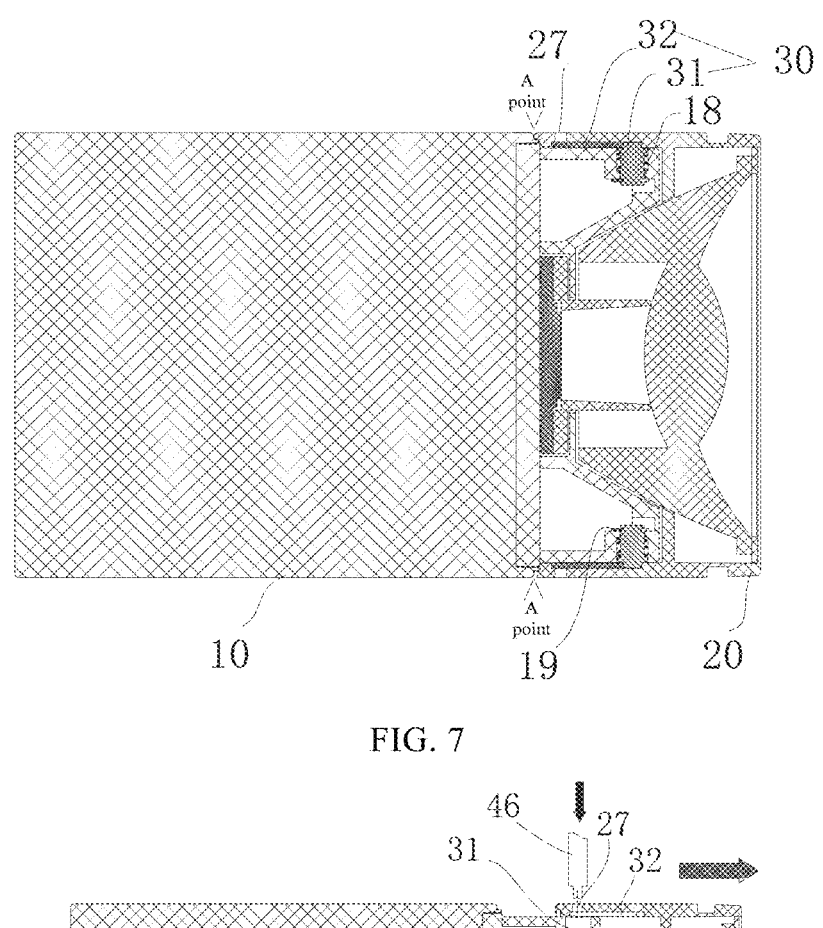
FIG. 7 is a sectional structural schematic view of the photographic and video light in FIG. 3.
FIG. 8 is a sectional schematic view of the light head module and the optical module of the photographic and video light in FIG. 7 during disassembly.
Figure 9:
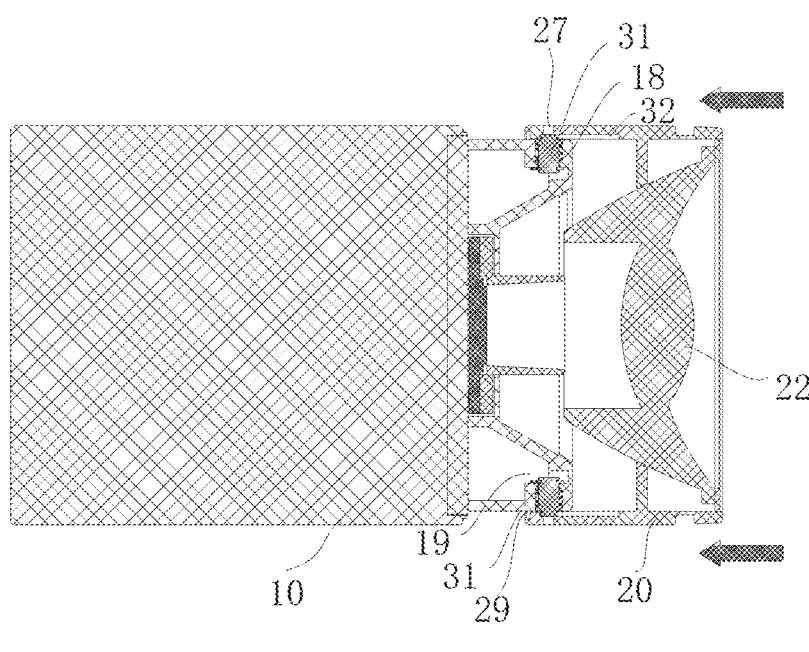
FIG. 9 is a sectional schematic view of the light head module and the optical module of the photographic and video light in FIG. 7 during installation.

Please refer to FIGS. 7 to 9, in this embodiment, the photographic and video light 100 further includes a connection assembly 30, and the connection assembly 30 is used to connect the first housing 11 and the second housing 21 to make the first housing 11 and the second housing 21 detachably connected.

As shown in FIG. 6, the connection assembly 30 includes a first connection portion 31 and a second connection portion 32. The first connection portion 31 is provided on the outer side of the first housing 11, and the second connection portion 32 is provided on the inner side of the second housing 21. The first connection portion 31 and the second connection portion 32 correspond to each other, and the first connection portion 31 is detachably connected to the second connection portion 32, so that the second housing 21 and the first housing 11 are detachably connected.

It is conceivable that in some embodiments, the first connection portion 31 and the second connection portion 32 may be an external thread and an internal thread that are fit with each other, and the first housing 11 and the second housing 21 are detachably connected through threads.

In other embodiments, the first connection portion 31 and the second connection portion 32 may be elastic snaps 14 that are fit with each other, and the first housing 11 and the second housing 21 are detachably connected by snapping the first connection portion 31 and the second connection portion 32.

In other embodiments, the first connection portion 31 and the second connection portion 32 may also be set as friction rings that are fit with each other, and the first housing 11 and the second housing 21 are detachably connected by sleeving the corresponding friction rings.

As shown in FIGS. 6 and 7, in this embodiment, the first connection portion 31 is a pin, which is movably inserted into a through hole at the recessed position 1103 of the first housing 11, and the first connection portion 31 can move radially along the first housing 11. The second connection portion 32 is a groove structure recessed on the second housing 21.

When the first connection portion 31 moves outward in the radial direction and extends out of the outer side of the first housing 11, the outer end of the first connection portion 31 is accommodated in the second connection portion 32, and the first connection portion 31 is locked with the second connection portion 32, so that the first housing 11 and the second housing 21 are fixed to each other.

When the first connection portion 31 moves inward in the radial direction and retracts to the outer side of the first housing 11, the first connection portion 31 is disengaged from the second connection portion 32, the first connection portion 31 and the second connection portion 32 are unlocked from each other, and the first housing 11 and the second housing 21 are detachable.

Specifically, there are two first connection portions 31 in this embodiment, which are symmetrically distributed at the recessed position 1103 of the first connection portion 31. The inner side of the corresponding second housing 21 is provided with two second connection portions 32 matching the first connection portions 31. The first connection portions 31 can move radially to embed into or disengage from the second connection portions 32, so as to realize the locking and unlocking of the first housing 11 and the second housing 21. This setting has a simple structure and strong stability, and is convenient for the manufacture of the first housing 11 and the second housing 21, which can effectively reduce the production cost.

It is conceivable that the driving mode of the first connection portion 31 can be realized by a driving motor and a transmission mechanism, so that the first connection portion 31 can extend or retract automatically.

Please refer to FIGS. 6 to 9, in this embodiment, the connection assembly 30 further includes an elastic member. The elastic member is provided between the first connection portion 31 and the first housing 11. The elastic member is used to drive the first connection portion 31 to reset, so that the first connection portion 31 keeps extending out of the outer side of the first housing 11 when no external force is applied.

Specifically, the elastic member is a spring 18. The spring 18 is sleeved on the first connection portion 31, and an end of the spring 18 abuts against the first connection portion 31, and another end of the spring 18 abuts against the first housing 11. When no external force is applied, the spring 18 will push the first connection portion 31 to protrude outward, so that the outer end of the first connection portion 31 can press the second connection portion 32 on the second housing 21, and the first housing 11 and the second housing 21 are fixed to each other.

Please refer to FIGS. 7 and 9, in this embodiment, the second housing 21 is further provided with a disassembly hole 27 corresponding to the first connection portion 31. The disassembly hole 27 penetrates through the side wall of the second housing 21 in the radial direction. The disassembly hole 27 can be passed through by an external thimble 46, so that the thimble 46 abuts against the outer end of the first connection portion 31, and the first connection portion 31 moves inward in the radial direction of the first housing 11 until the outer end of the first connection portion 31 is flush with the outer side of the first housing 11.

In this embodiment, the disassembly hole 27 provided on the second housing 21 is used for the thimble 46 to pass through. The thimble 46 can press the first connection portion 31, such that the elastic member on the first connection portion 31 is further compressed, to compress the outer end of the first connection portion 31 back into the first housing 11, so that the first connection portion 31 and the second connection portion 32 are disengaged from each other and unlocked, so as to realize the disassembly of the optical module 20 and the light head module 10.

The radial movement of the first connection portion 31 is realized through the cooperation of the disassembly hole 27, the thimble 46, and the elastic member, so as to disassemble the light head module 10 and the optical module 20. The overall structure is simple and convenient to disassemble, which can effectively reduce the manufacturing difficulty of the first housing 11 and the second housing 21, and avoids the first housing 11 and the second housing 21 from forced damage during disassembly, and is convenient for the disassembly of the optical module 20 and the light head module 10. Through the above structure, the user can quickly replace the optical module 20 to achieve the purpose of using the optical modules 20 with different light effects.

Please refer to FIGS. 6 and 7, in some embodiments, the second connection portion 32 extends along the axial direction of the second housing 21 to form a waist-shaped groove. The first connection portion 31 can move along the extension direction of the second connection portion 32, so that the first housing 11 and the second housing 21 approach or move away from each other.

Specifically, the second connection portion 32 is a waist-shaped groove recessed on the inner side of the second housing 21 and extending along the axial direction of the second housing 21. The outer end of the first connection portion 31 can extend into the second connection portion 32 and move inside the second connection portion 32. The second housing 21 moves left and right along the axial direction of the first housing 11, so that the second housing 21 extends and retracts at the front end of the first housing 11 to drive the light effect lens 22 in the second housing 21 to move away from or close to the light source assembly 13, thereby adjusting the light angle of the light source assembly 13 emitted from the light outlet 26, which can change the lighting area of the photographic and video light 100, thereby enriching the product functions and improving the user experience.

As shown in FIG. 6, the extension length of the second connection portion 32 is equal to the distance between point A and point B on the first housing 11, so as to limit the movement distance of the optical module 20, so that the second housing 21 can move back and forth between point A and point B on the first housing 11.

Please refer to FIG. 7, in this embodiment, a gasket 19 is further provided at the inner end of the first connection portion 31. The gasket 19 is located between the first connection portion 31 and the inner side of the first housing 11 to prevent the first connection portion 31 and the first housing 11 from separating from each other.

Please refer to FIGS. 6 and 7, in this embodiment, the disassembly hole 27 is set at the end of the waist-shaped hole formed by the second connection portion 32 near the light inlet 25. That is, the disassembly hole 27 is set at an end of the second connection portion 32 near the light source. When the second housing 21 moves to point B, the disassembly hole 27 is directly opposite to the first connection portion 31. Only need to insert the thimble 46 into the disassembly hole 27 and move the second housing 21 a short distance, the first housing 11 and the second housing 21 can be separated from each other.

Please refer to FIG. 9. The inner side of the end of the light inlet 25 of the second housing 21 is provided with an inwardly inclined guiding bevel 29. When the second housing 21 is moved toward the first housing 11 for installation, the guiding bevel 29 of the second housing 21 will gradually press the outer end of the first connection portion 31, causing the first connection portion 31 to retract into the first housing 11.

The inwardly inclined guiding bevel 29 is provided at the inner end of the light inlet 25 of the second housing 21. When the optical module 20 needs to be mounted, there is only need to align the end of the light inlet 25 of the second housing 21 with the open end 1102 of the first housing 11, and then push the optical module 20 backward, to make the guiding bevel 29 on the second housing 21 gradually press the outer end of the first connection portion 31, causing the first connection portion 31 to retract into the first housing 11.

Figure 12:
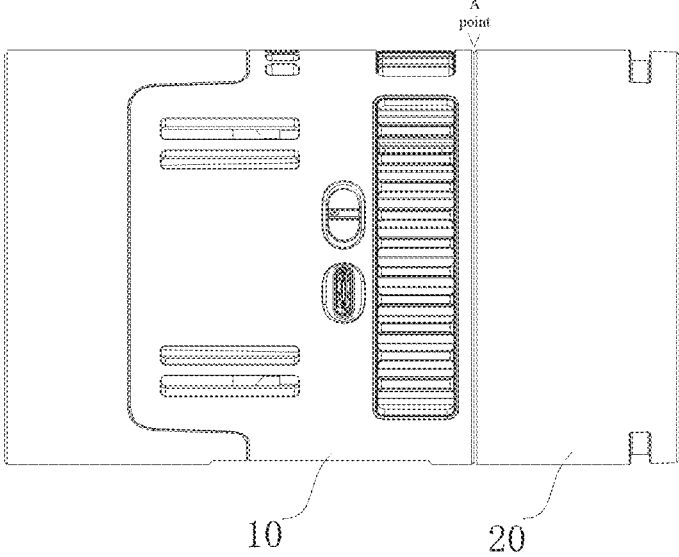
FIG. 12 is a structural schematic view of the light head module and the optical module of the photographic and video light in a shortened state.
Figure 13:
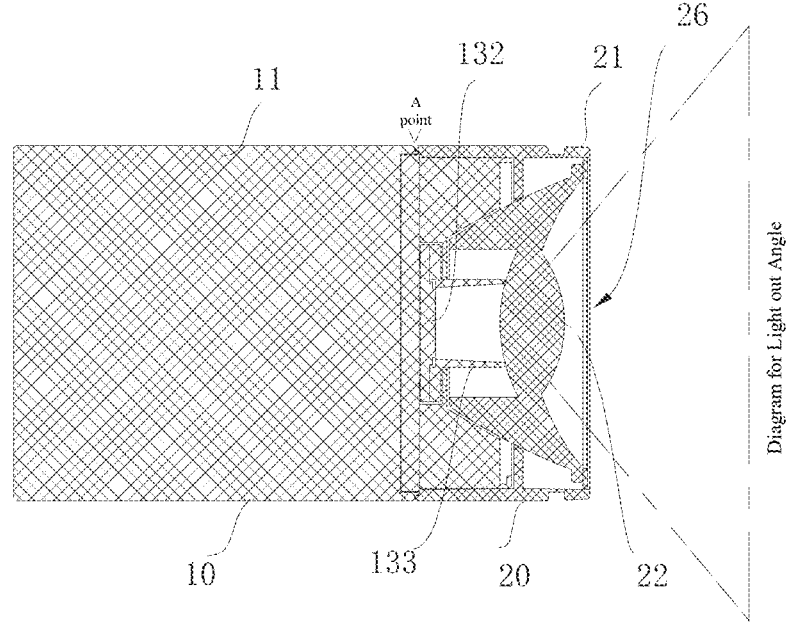
FIG. 13 is a sectional schematic view of the photographic and video light in FIG. 12.
Figure 14:
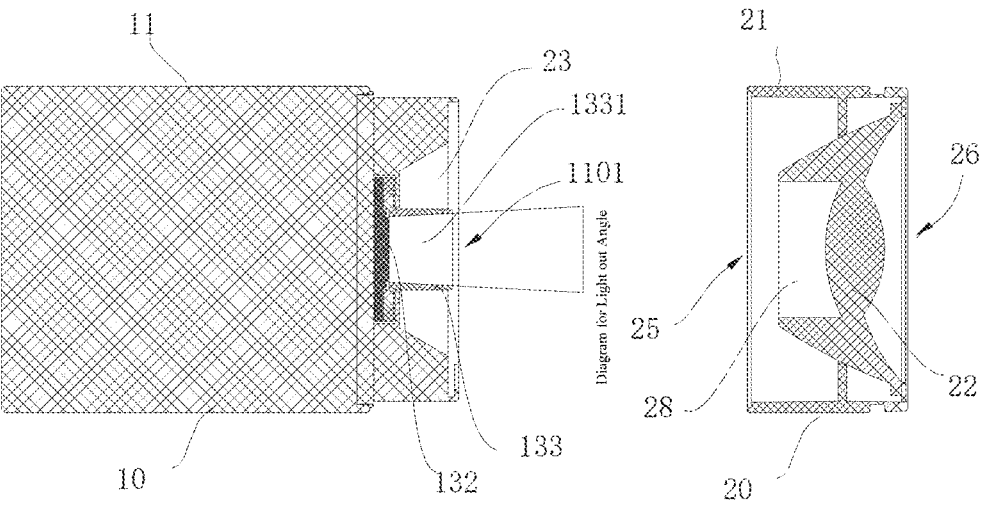
FIG. 14 is a sectional structural schematic view of the light head module and the optical module in FIG. 10 during disassembly.

With reference to FIGS. 12 to 14, after the first connection portion 31 moves to a position opposite to the second connection portion 32, the first connection portion 31 is reset under the driving force of the elastic member, causing the outer end of the first connection portion 31 to extend into the second connection portion 32 again, thereby achieving quick and accurate assembly of the light head module 10 and the optical module 20. The entire assembly process is simple and fast, facilitating the quick installation of the optical module 20.

It can be understood that the photographic and video light 100 of this embodiment achieves a detachable connection between the optical module 20 and the light head module 10 because the first housing 11 is detachably connected with the second housing 21. On one hand, this facilitates the carrying and transportation of the photographic and video light 100 by users. On the other hand, users can select optical modules 20 that produce different light effects according to their own needs, which greatly enriches the functions of the product, facilitates user operation, and significantly improves the user experience. In addition, since the second housing 21 is movably sleeved on the open end 1102 of the first housing 11, the optical module 20 can move and extend and retract at the front end of the light head module 10 to adjust the distance between the light source assembly 13 and the light effect lens 22, thereby adjusting the light output angle. This can greatly enrich the functions of the product, making it more user-friendly and optimizing the user experience.

Therefore, since the second housing 21 is movably connected to the open end 1102 of the first housing 11, the second housing 21 can move back and forth between point A and point B on the first housing 11, to drive the second housing 21 to extend and retract at the front end of the first housing 11, thereby making the light effect lens 22 in the second housing 21 to approach or move away from the light source assembly 13 in the first housing 11, to change the light output angle of the light passing through the light effect lens 22, thereby changing the lighting area of the photographic and video light 100, enriching the product's functions and improving the user experience.

Please refer to FIGS. 15 to 18, in this embodiment, the power supply module 40 of the present application may include a third housing 42 and a battery 43 provided in the third housing 42. The end of the third housing 42 is detachably connected to the installation end 1101.

Alternatively, the power supply module 40 includes an adapter assembly 51 and a power adapter 52 connected to an end of the adapter assembly 51. The adapter assembly 51 is provided in the third housing 42. The end of the third housing 42 away from the power adapter 52 is detachably connected to the installation end 1101. The adapter assembly 51 is electrically connected to the power adapter 52, which is used to connect to a mains socket.

Regardless of the structural form of the power supply module 40, the power supply module 40 is detachably connected to the light head module 10. When the light head module 10 and the optical module 20 are also detachably connected, the photographic and video light 100 can be disassembled into three parts, to reduce its volume and occupied space, which facilitates the carrying and transportation of the photographic and video light 100 when users go out.

The following describes the power supply module 40 in two different structural forms in this embodiment.

Embodiment 1

With reference to FIGS. 15 to 18, in this embodiment, the power supply module 40 includes a third housing 42 and a battery 43. The battery 43 is provided inside the third housing 42. After the first terminal 12 of the light head module 10 is docked with the second terminal 41 of the power supply module 40 of the third housing 42, the battery 43 can supply power to the light head module 10 through the docked first terminal 12 and second terminal 41 to ensure the normal operation of the photographic and video light 100.

The power supply mode of the photographic and video light 100 in this embodiment is powered by the battery, which allows the photographic and video light 100 to be fully charged by replacing the battery 43 when used outdoors, thereby meeting the usage requirements of the photographic and video light 100 for outdoor work.

Figure 16:
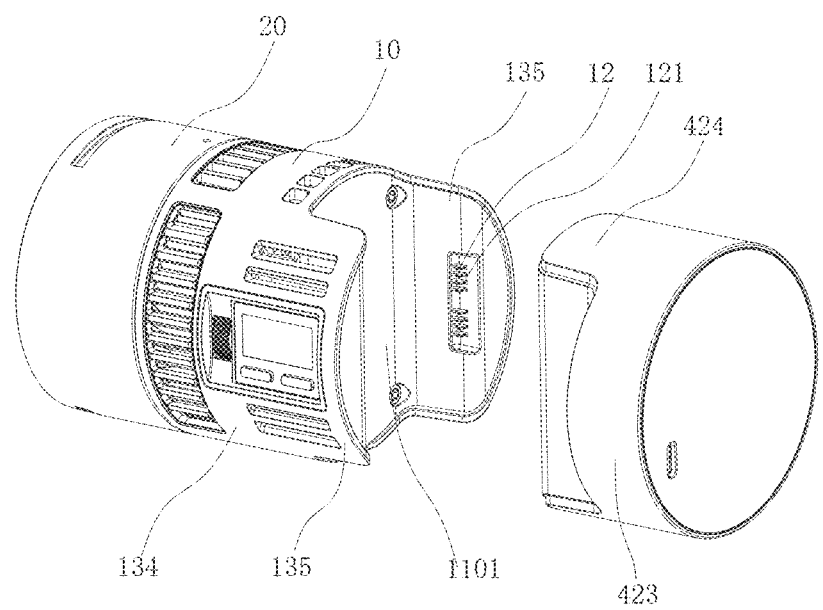
FIG. 16 is another exploded view of the photographic and video light shown in FIG. 15.

With reference to FIGS. 15 and 16, in this embodiment, the third housing 42 includes a second main body 423 and a fixing portion 424 protruding from an end of the second main body 423. The inside of the second main body 423 is in communication with the inside of the fixing portion 424 to form an installation cavity together. The battery 43 is provided in the installation cavity, and plurality of batteries 43 can be provided in the installation cavity. Both side edges of the second main body 423 extend outward beyond the side surfaces of the fixing portion 424, making the overall third housing 42 be a T-shaped structure.

The second terminal 41 is provided on the side wall of the fixing portion 424. The second terminal 41 of this embodiment includes plurality of connection grooves 411, which are provided at intervals on the side wall of the fixing portion 424.

Further, the light head module 10 of this embodiment includes a first main body 134 and two flanges 135. The two flanges 135 are opposite, spaced apart and protruded from an end of the first main body 134. In other examples of this embodiment, the number of flanges 135 can also be three, four, etc., as long as plurality of flanges 135 are provided at intervals.

The inner walls of the two flanges 135 and the end surface of the first main body 134 enclose to form the installation end 1101. The fixing portion 424 of the power supply module 40 can be detachably accommodated in the installation end 1101. When the power supply module 40 is docked with the light head module 10, the ends of the flanges 135 abut against the edges of the end surface of the second main body 423, and the inner walls of the flanges 135 are attached to the surfaces of the fixing portion 424, so that the power supply module 40 is firmly connected to the light head module 10.

After the power supply module 40 is connected to the light head module 10 in this embodiment, the power supply module 40 and the light head module 10 together form a cylindrical structure. This arrangement can optimize the overall structural form of the photographic and video light

100 and achieve a compact and portable design of the photographic and video light 100.

In this embodiment, the first terminal 12 is provided on the inner wall of the flange 135. The first terminal 12 includes plurality of connection pieces 121 provided at intervals. When the power supply module 40 is docked with the light head module 10, the connection pieces 121 can be inserted into the connection grooves 411 along the docking direction of the power supply module 40 and the light head module 10.

There are a plurality of connection pieces 121 and a plurality of connection grooves 411. The plurality of connection pieces 121 are inserted into the plurality of connection grooves 411 one-by-one, so that the first terminal 12 is electrically connected to the second terminal 41, thereby realizing the power supply from the battery 43 in the power supply module 40 to the light head module 10.

Figure 17:
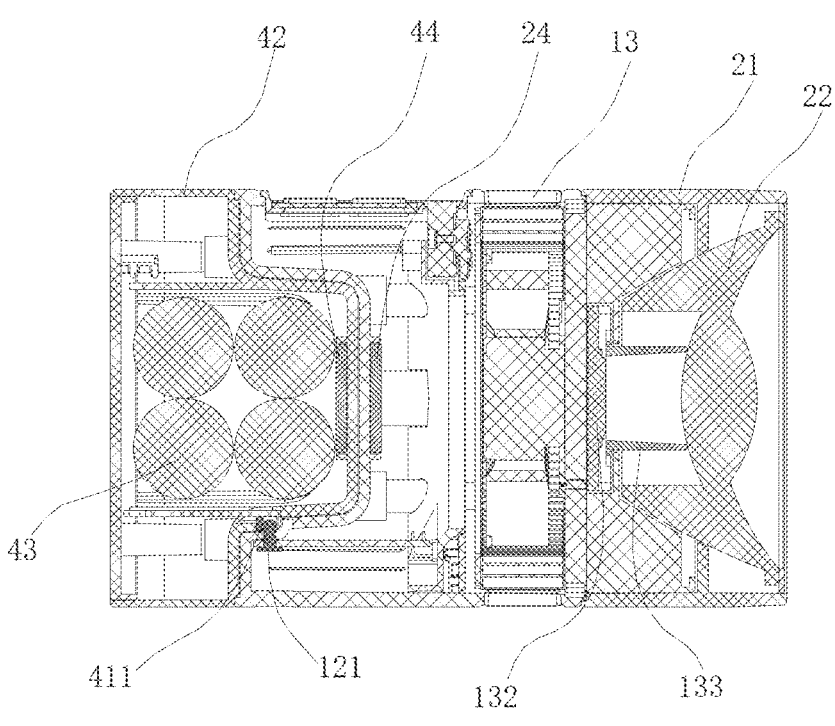
FIG. 17 is a sectional view of the photographic and video light shown in FIG. 15.
Figure 18:
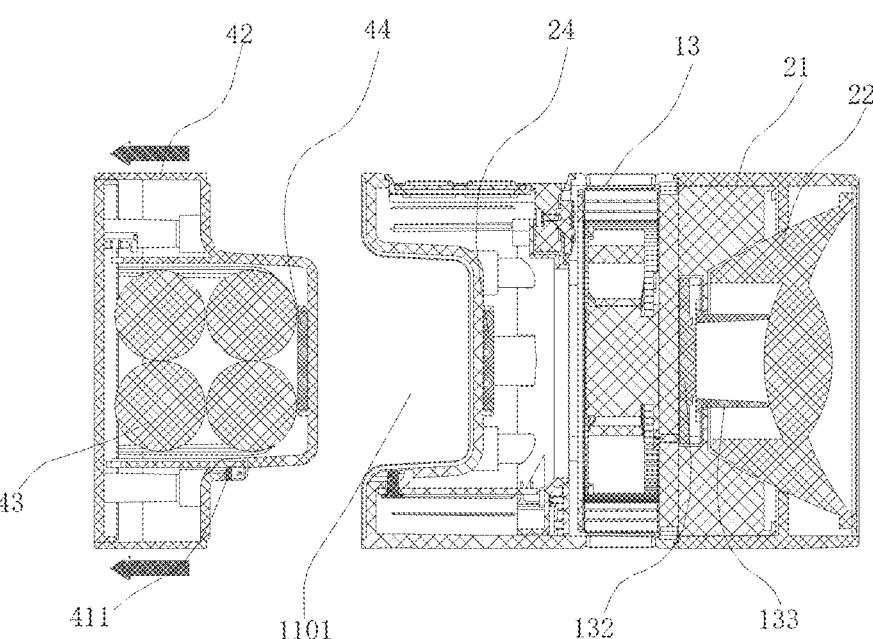
FIG. 18 is an exploded view of FIG. 17.

With reference to FIGS. 17 and 18, further, the light head module 10 of this embodiment further includes a first magnet 24. The first magnet 24 is provided inside the first housing 11 and corresponds to the installation end 1101. In this embodiment, the first magnet 24 is provided inside the light source housing 131 and attached to the inner wall of the light source housing 131.

The power supply module 40 further includes a second magnet 44. The second magnet 44 is provided inside the third housing 42 and corresponds to the end of the fixing portion 424. When the power supply module 40 is fixed at the installation end 1101, the first magnet 24 and the second magnet 44 are magnetically fixed to each other, so that the power supply module 40 is firmly connected to the light head module 10.

In other examples of this embodiment, the light head module 10 and the power supply module 40 can also be electrically connected through a wireless communication module to realize the transmission of electrical signals and communication signals between them.

Further, with reference to FIGS. 19 to 23, the first housing 11 of this embodiment is provided with a snap 14. The snap 14 is provided on the end surface of the first main body 134. There are a plurality of snaps 14, which can be snapped with plurality of snap slots 15 on the third housing 42 one-by-one, to realize the docking of the power supply module 40 and the light head module 10.

In this embodiment, the snap 14 includes an extension portion 141 and a snap portion 142 bent and connected to the end of the extension portion 141. The snap portion 142 protrudes from the first housing 11. The snap slot 15 is opened on the third housing 42. When the light head module 10 is detachably docked with the power supply module 40, the snap portion 142 is snapped with the inner wall of the snap slot 15. In other examples of this embodiment, the snap 14 can be provided on the third housing 42, and the snap portion 142 protrudes from the third housing 42. The snap portion 142 can be snapped on the inner wall of the snap slot 15 on the first housing 11.

Figure 23:
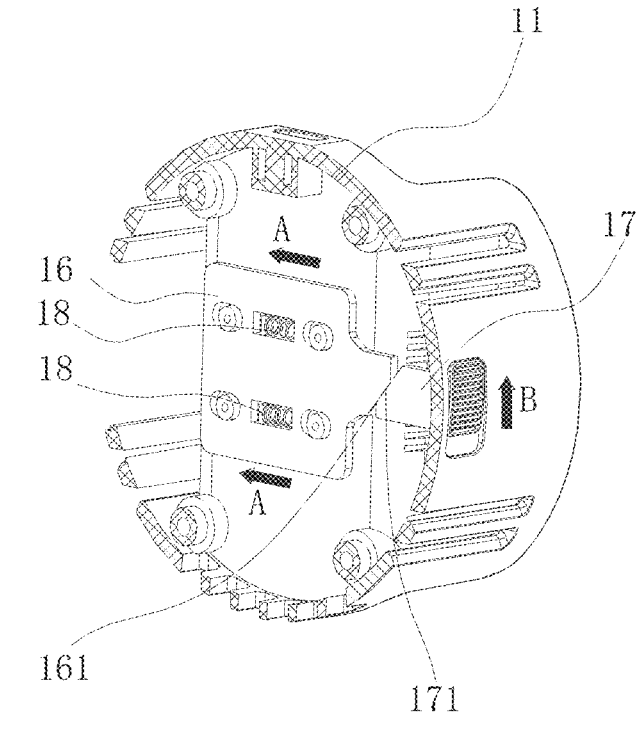
FIG. 23 is a schematic view of an internal structure of the light head module when the snap is released from snapping in the photographic and video light of the present application.
Figure 24:
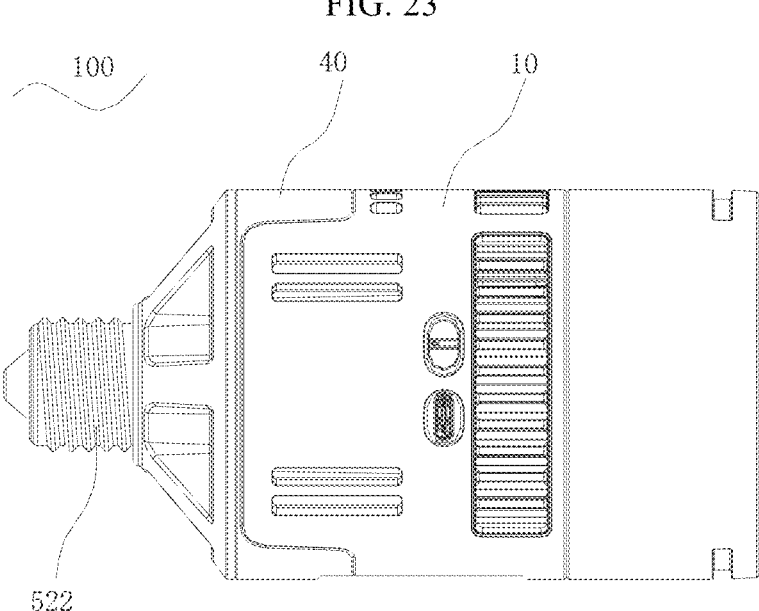
FIG. 24 is a structural schematic view of Embodiment 2 of the photographic and video light of the present application.
Figure 25:
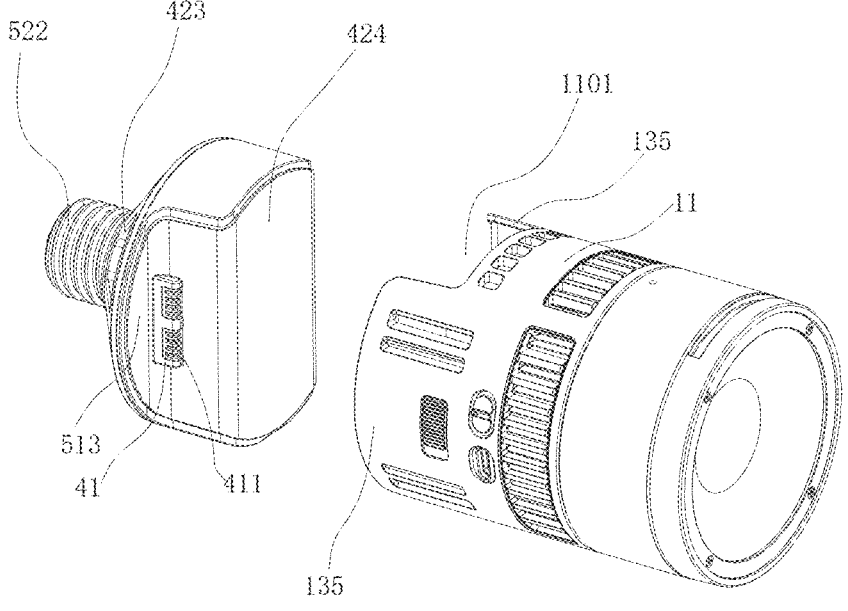
FIG. 25 is an exploded view of the photographic and video light shown in FIG. 24.
Figure 26:
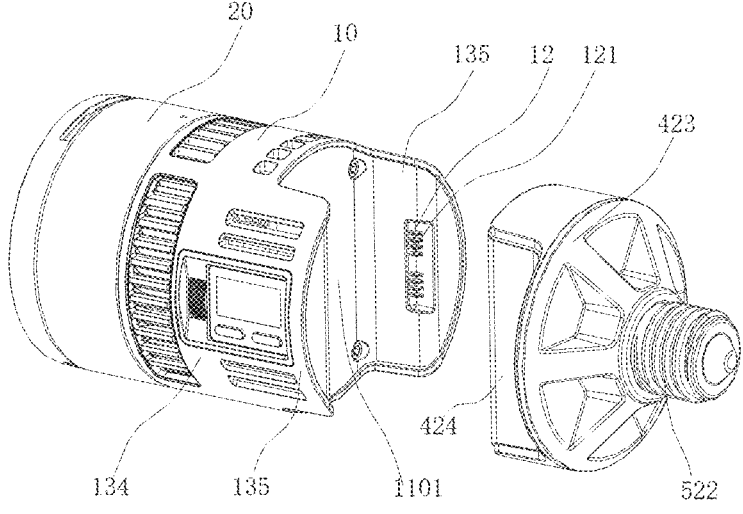
FIG. 26 is another exploded view of the photographic and video light shown in FIG. 24.

As shown in FIG. 23, the snap 14 of this embodiment can move relative to the first housing 11 in a first direction (the direction indicated by arrow A), so that the snap 14 is disengaged from the snap slot 15 of the third housing 42, thus the light head module 10 and the power supply module 40 are undocked. The first direction in which the snap 14 moves is parallel to the surface of the first housing 11 where the snap 14 is located.

In this embodiment, the light head module 10 further includes a pressure plate 16 and a pusher 17. The pressure plate 16 is provided inside the first housing 11. An end of the snap 14 is fixed on the pressure plate 16, and the snap portion 142 of the snap 14 protrudes from the first housing 11 to snap with the snap slot 15. An end of the pusher 17 abuts against the end of the pressure plate 16, and another end of the pusher 17 protrudes from the first housing 11.

The end surface of the pusher 17 protruding from the first housing 11 is provided with plurality of spaced convex stripes to increase the friction force for users when users touch and toggle, facilitating users to control and adjust the pusher 17.

When the photographic and video light 100 needs to be disassembled into two parts, the pusher 17 can be pushed to move in a second direction (the direction indicated by arrow B). The end of the pusher 17 can push the pressure plate 16 to move in the first direction, so that the snap 14 is disengaged from the snap slot 15, and the photographic and video light 100 is separated into two parts: the power supply module 40 and the light head module 10. The second direction is perpendicular to the first direction.

In this embodiment, the end surface of the pressure plate 16 for abutting against the pusher 17 is a first inclined surface 161, and the end surface of the pusher 17 for abutting against the pressure plate 16 is a second inclined surface 171. The first inclined surface 161 is attached to the second inclined surface 171. When the pusher 17 moves in the second direction, the second inclined surface 171 moves adhering to the first inclined surface 161 to push the pressure plate 16 to move in the first direction.

Figure 19:
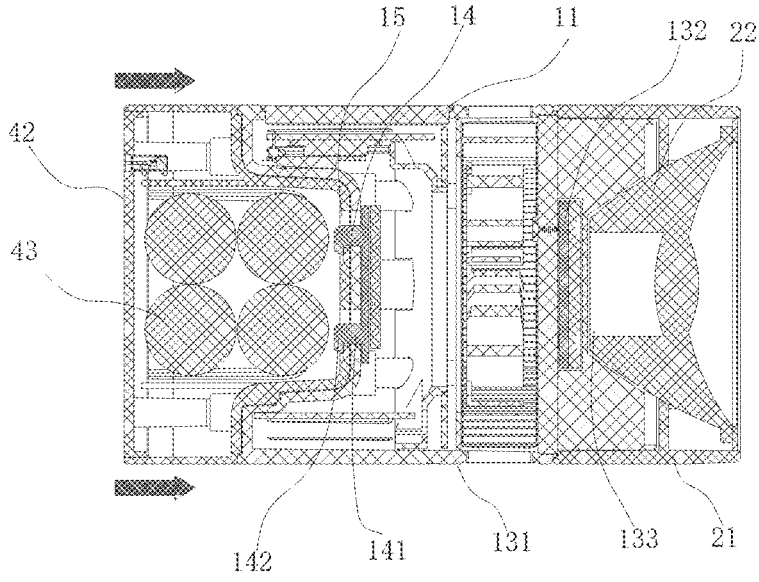
FIGS. 19 to 20 are schematic views of a docking structure of the power supply module and the light head module of the photographic and video light of the present application.
Figure 20:
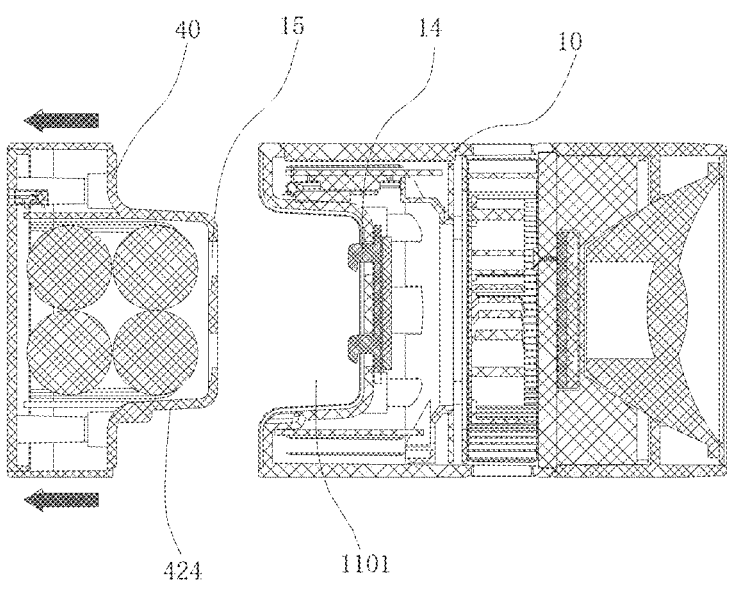

With reference to FIGS. 18 to 20, the light head module 10 of this embodiment further includes a spring 18. The spring 18 is fixed inside the first housing 11, and the first end of the spring 18 abuts against the pressure plate 16. The spring 18 can elastically expand and contract. When the pusher 17 moves in the second direction, the pressure plate 16 presses the spring 18 to make the spring 18 in a compressed state. When the snap 14 moves in the first direction to a first working position, the snap 14 can be disengaged from the snap slot 15.

Figure 21:
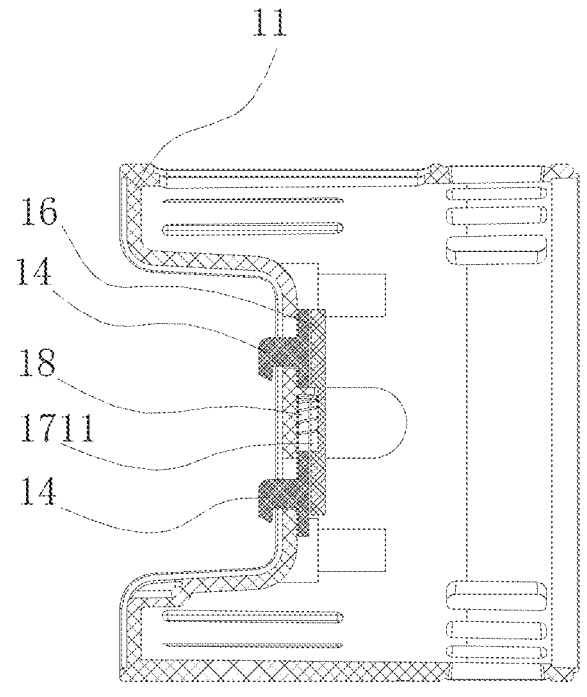
FIGS. 21 to 22 are sectional views of an internal structure of the light head module of the photographic and video light of the present application.
Figure 22:
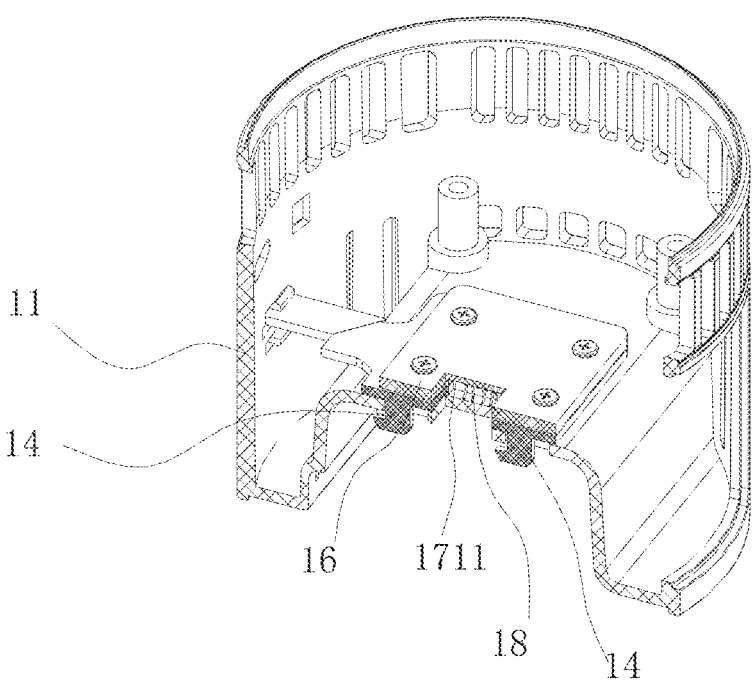

As shown in FIGS. 21 to 23, if the power supply module 40 needs to be docked with the light head module 10, the spring 18 elastically extends. The spring 18 abutting against the pressure plate 16 can make the pressure plate 16 move in a direction opposite to the first direction. The first inclined surface 161 of the pressure plate 16 moves adhering to the second inclined surface 171 of the pusher 17, so that the snap 14 moves to a second working position, realizing the reset of the snap. The snap 14 in the second working position can be snapped with the snap slot 15. That is, after the power supply module 40 and the light head module 10 are disengaged, under the elastic extension of the spring 18, the snap 14 can automatically reset to the second working position without other assistance, so as to be docked with the snap slot 15 and realize the docking of the power supply module 40 and the light head module 10.

In this embodiment, there are two springs 18. The arrangement of the two springs 18 can effectively and stably realize the reset of the snap 14. In other examples of this embodiment, there also can be three, four, etc. springs 18, which is not limited here.

Two through grooves 1711 are spacedly opened on the pressure plate 16, and the two springs 18 are respectively accommodated in the two through grooves 1711. This arrangement can reasonably utilize the internal space of the first housing 11, thereby avoiding the light head module 10 from being too large in size, and ensuring the compact design of the overall photographic and video light 100.

In this embodiment, an end of the spring 18 is fixed inside the first housing 11, and another end of the spring 18 abuts against the inner wall of the through groove 1711 on the pressure plate 16. When the pressure plate 16 moves in the first direction, the spring 18 can be elastically compressed under the abutting action of the pressure plate 16. When the spring 18 elastically extends, the end of the spring 18 can abut against the pressure plate 16, so that the pressure plate 16 moves in a direction opposite to the first direction, thereby realizing the reset of the snap 14.

When transporting or carrying the photographic and video light 100 in this embodiment, the end of the pusher 17 can be toggled to make the pusher 17 move in the second direction. The second inclined surface 171 of the pusher 17 adheres to the first inclined surface 161 of the pressure plate 16 to push the pressure plate 16 to move in the first direction. At this time, the pressure plate 16 presses the spring 18, causing the spring 18 to be in a compressed state.

The pressure plate 16 moves in the first direction, and then the snap 14 on the pressure plate 16 moves in the first direction. The snap portion 142 of the snap 14 can disengage from the inner wall of the snap slot 15, so that the snap 14 is disengaged from the snap slot 15, and the power supply module 40 is separated from the light head module 10.

After releasing the toggle on the pusher 17, the spring 18 can elastically extend, and the end of the spring 18 can abut against the pressure plate 16, so that the pressure plate 16 moves in the direction opposite to the first direction, thereby realizing the reset of the snap 14, so that the snap 14 of the light head module 10 can be docked with the snap slot 15 of the power supply module 40.

For the photographic and video light 100 of this embodiment, when the power supply module 40 is docked with the light head module 10, the light head module 10 and the power supply module 40 can be detachably docked. The power supply module 40 can supply power to the light head module 10, and the first housing 11 and the third housing 42 form the housing of the photographic and video light 100. This setting enables the photographic and video light 100 to be disassembled into two parts: the light head module 10 and the power supply module 40, and the light head module 10 has no battery compartment structure. In practical use, the photographic and video light 100 can be disassembled into two parts. Since the light head module 10 is small in size, it is convenient to carry and transport the photographic and video light 100. The quick docking of the power supply module 40 and the light head module 10 can be realized through the docking of the snap 14 and the snap slot 15, ensuring the normal use of the photographic and video light 100 and the user experience.

In addition, in other examples of this embodiment, magnets can also be set inside the first housing 11 and inside the third housing 42. The light head module 10 can be detachably docked with the power supply module 40 through magnetic docking.

Embodiment 2

As shown in FIGS. 24 to 27, in this embodiment, the power supply module 40 includes an adapter assembly 51. The adapter assembly 51 includes a power adapter 52 connected to an end of the third housing 42. The adapter assembly 51 is electrically connected to the power adapter 52, and the power adapter 52 is used to connect to a mains socket.

An end of the adapter assembly 51 is used to be detachably connected to the installation end 1101 of the first housing 11. An end of the power adapter 52 is connected to the adapter assembly 51, and another end of the power adapter 52 is used to connect to a mains socket, so that the photographic and video light 100 can be docked with the mains socket, and the mains socket supplies power to the photographic and video light 100.

The power supply mode of the photographic and video light 100 in this embodiment is powered by the mains socket, such that after the photographic and video light 100 is used outdoors and used in an indoor environment, the adapter assembly 51 can be replaced to dock with the mains to achieve a full charge in time, thereby meeting the usage requirements of the photographic and video light 100 for working in the indoor environment.

In this embodiment, the third housing 42 further includes a second main body 423 and a fixing portion 424. The second main body 423 is provided between the power adapter 52 and the fixing portion 424, and the power adapter 52 is connected to another end of the fixing portion 424 through the second main body 423. The edge of the end surface of the second main body 423 extends outward beyond the fixing portion 424, so that the power adapter 52, the second main body 423, and the fixing portion 424 are integrally in an umbrella-shaped structure.

The second terminal 41 is provided on the side wall of the fixing portion 424. The second terminal 41 of this embodiment includes a plurality of connection grooves 411, and the plurality of connection grooves 411 are provided at intervals on the side wall of the fixing portion 424. The extension direction of the plug-in slot 5211 is consistent with the extension direction of the fixing portion 424.

For the photographic and video light 100 of the present application, the photographic and video light 100 can be disassembled into two parts: the light head module 10 and the power supply module 40, which is convenient for carrying and transporting the photographic and video light 100. And the power supply module 40 can be disassembled from the light head module 10, that is, the light head module 10 can be docked with different types of power supply modules 40, ensuring that the photographic and video light 100 can meet the needs of long-time shooting, and can be suitable for indoor shooting environments with external sockets or outdoor shooting environments without external sockets, ensuring the user experience.

Figure 27:
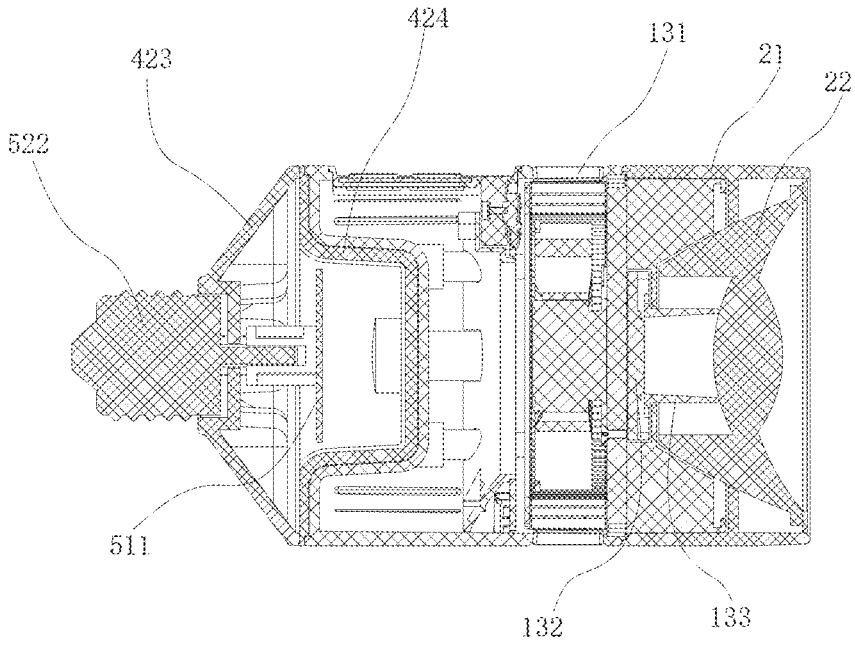
FIG. 27 is a sectional view of the photographic and video light shown in FIG. 24.
Figure 28:
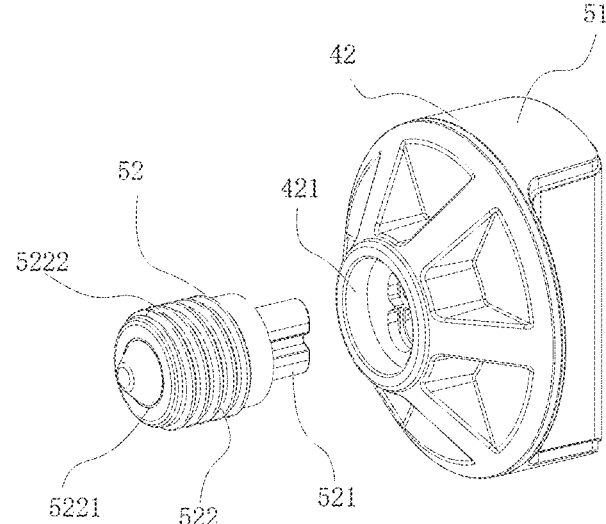
FIG. 28 is an exploded view of Embodiment 1 of a power supply module of the present application.
Figure 29:
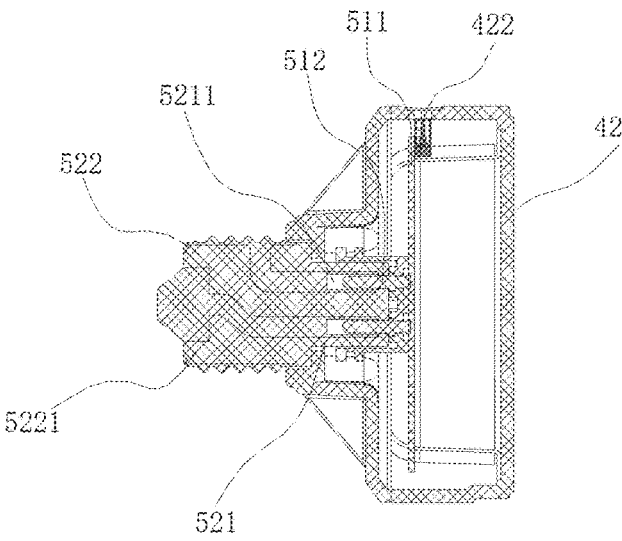
FIG. 29 is a sectional view of Embodiment 1 of the power supply module of the present application.
Figure 30:
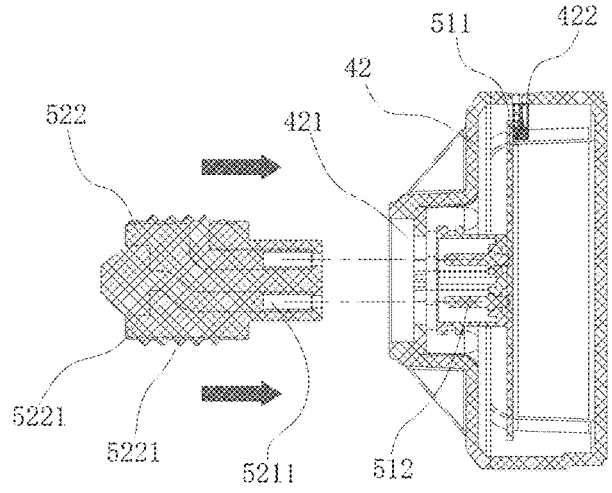
FIG. 30 is a cross-sectional view of Embodiment 1 of the power supply module of the present application.
Figure 31:
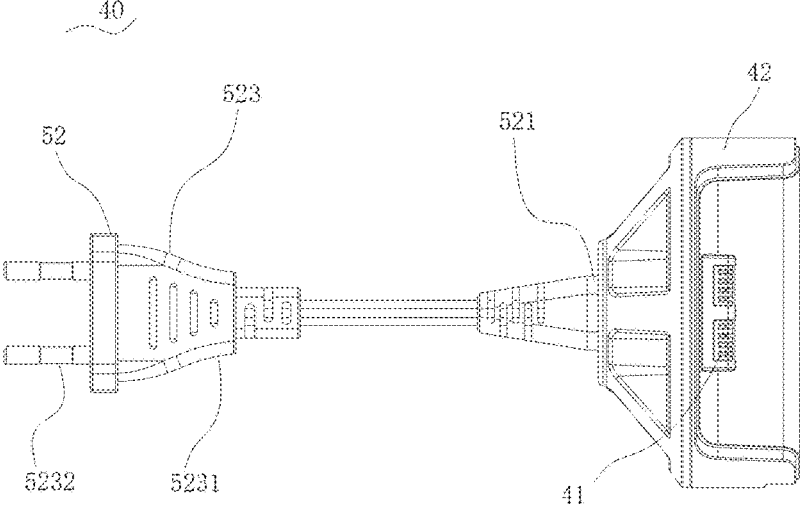
FIG. 31 is a structural schematic view of Embodiment 2 of the power supply module of the present application.
Figure 32:
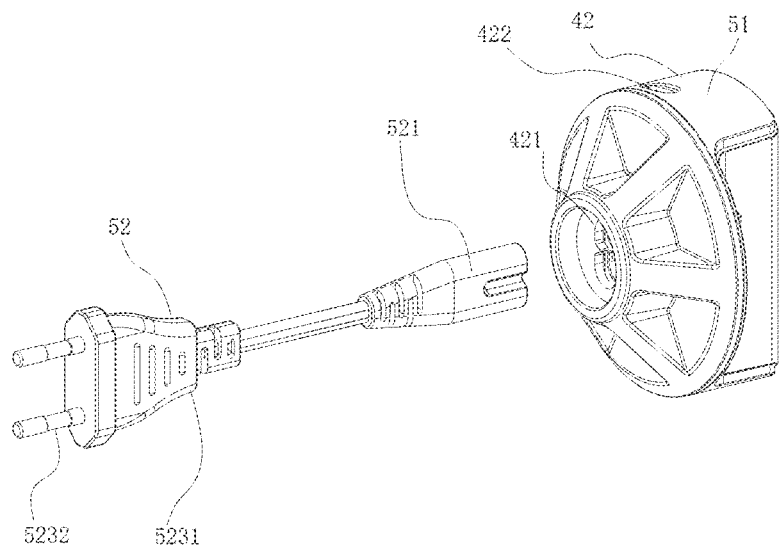
FIG. 32 is an exploded view of Embodiment 2 of the power supply module of the present application.
Figure 33:
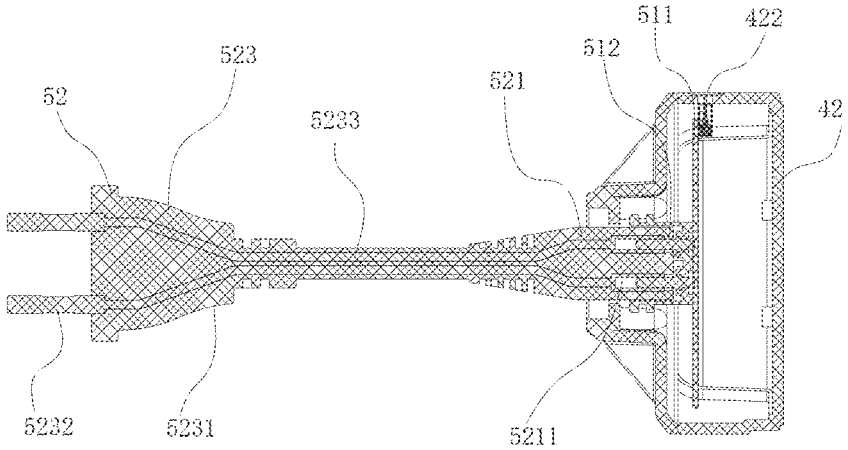
FIG. 33 is a sectional view of Embodiment 2 of the power supply module of the present application.
Figure 34:
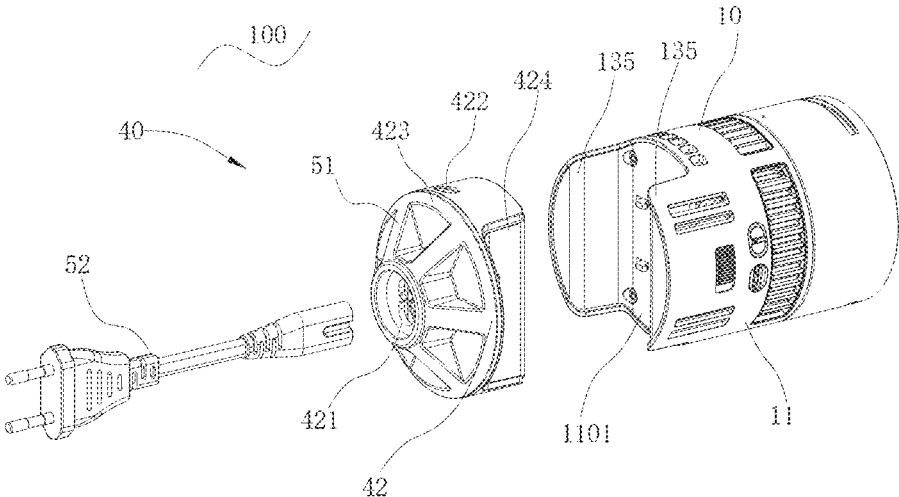
FIG. 34 is an exploded view of the photographic and video light of Embodiment 2 of the power supply module of the present application.

Referring to FIG. 27, in some embodiments, the adapter assembly 51 includes an adapter circuit board 511 provided in the third housing 42 and a first conductive connection portion 512. The first conductive connection portion 512 is electrically connected to the adapter circuit board 511, and the adapter assembly 51 is used to dock with the light head module 10 to supply power to the light head module 10.

In some embodiments, the power adapter 52 can have different structural forms. The power supply modules 40 with power adapters 52 of different structural forms are described below.

Power Supply Module 40 Embodiment 1

As shown in FIGS. 26 to 30, an embodiment of the present application provides a power supply module 40 for docking with a light head module 10 to supply power to the light head module 10. The power supply module 40 includes an adapter assembly 51 and a power adapter 52. Specifically, the adapter assembly 51 includes a third housing 42, an adapter circuit board 511 provided in the third housing 42, and a first conductive connection portion 512. The first conductive connection portion 512 is electrically connected to the adapter circuit board 511.

The power adapter 52 includes a second conductive connection portion 521, an end of the power adapter 52 of this embodiment away from the second conductive connection portion 521 is a light head connector 522 for connecting to a light socket.

In this embodiment, the first conductive connection portion 512 is electrically connected to the adapter circuit board 511. The third housing 42 is provided with an insertion port 421, and the insertion port 421 is communicated with the inside of the third housing 42. The adapter circuit board 511 is provided inside the third housing 42 and corresponds to the insertion port 421. The first conductive connection portion 512 of this embodiment is in the structure of a pin 5121. An end of the first conductive connection portion 512 is connected to the adapter circuit board 511, and another end of the first conductive connection portion 512 protrudes toward the direction of the insertion port 421.

In this embodiment, there are two first conductive connection portions 512, and the two first conductive connection portions 512 are provided at intervals on the adapter circuit board 511.

The third housing 42 of this embodiment is also provided with a charging port 422. The charging port 422 can be connected to other electronic devices, so that the power supply module 40 can be used as a charger for other electronic devices. In addition, the adapter assembly 51 further includes a second terminal 41, and the second terminal 41 is provided at the end of the third housing 42. The second terminal 41 can be docked with the first terminal 12 of the light head module 10, so that the power supply module 40 is electrically connected to the light head module 10. The second terminal 41 includes a plurality of connection grooves 411 provided at intervals.

Further, in this embodiment, the power adapter 52 includes a second conductive connection portion 521 and a light head connector 522 connected to the second conductive connection portion 521. The second conductive connection portion 521 is provided with a plug-in slot 5211, and the first conductive connection portion 512 can be inserted into the plug-in slot 5211 to realize electrical connection.

In other examples of the application, the first conductive connection portion 512 can be a plug-in slot 5211 opened on the adapter circuit board 511, the second conductive connection portion 521 is a structure of a pin 5121 protruding from the power adapter 52, and the first conductive connection portion 512 can be inserted into the plug-in slot 5211 for electrical connection.

Or, the first conductive connection portion 512 is a bump structure protruding from the adapter circuit board 511, and the second conductive connection portion 521 is a recessed structure provided on the power adapter 52. The first conductive connection portion 512 can be in contact and docking with the second conductive connection portion 521 to realize electrical connection.

Or, the first conductive connection portion 512 is a recessed structure recessed on the adapter circuit board 511, and the second conductive connection portion 521 is a bump structure protruding from the power adapter 52. The first conductive connection portion 512 can be in contact and docking with the second conductive connection portion 521 to realize electrical connection.

In this embodiment, the light head connector 522 includes a connector main body 5221 and a thread portion 5222 provided on an outer circumference of the connector main body 5221. The second conductive connection portion 521 protrudes from an end of the connector main body 5221, and an outer circumference of the second conductive connection portion 521 is in a shape liked number 8. A step structure is formed at a joint where the second conductive connection portion 521 and the connector main body 5221 are connected.

In addition to the structure of the threaded light head connector 522 shown in this embodiment, according to the structure of different light sockets, the light head connector 522 can also be designed into other structural forms, such as a socket type, a magnetic type, etc.

When the second conductive connection portion 521 is docked with the first conductive connection portion 512, the second conductive connection portion 521 extends into the inside of the third housing 42 through the insertion port 421 to be docked with the first conductive connection portion 512, so that the power adapter 52 and the adapter assembly 51 are connected to form the power supply module 40. The step structure formed at the joint where the second conductive connection portion 521 and the connector main body 5221 are connected abuts against the convex edge of the inner wall of the third housing 42 to ensure the stable docking of the first conductive connection portion 512 and the second conductive connection portion 521.

When the power supply module 40 needs to be docked with a light socket, the power adapter 52 with the light head connector 522 is selected to be docked with the adapter assembly 51. After the second conductive connection portion 521 is docked with the first conductive connection portion 512, the power adapter 52 with the light head connector 522 can be connected to the adapter assembly 51, so that the power supply module 40 can be used for the connection of the light socket and ensure the power supply of the light socket to the light head module 10.

Power Supply Module 40 Embodiment 2

Referring to FIGS. 31 to 34, the structure of the power supply module 40 in this embodiment is mainly different from that of the power supply module 40 in Embodiment 1 in that: an end of the power adapter 52 away from the second conductive connection portion 521 is a plug connector 523 for connecting to the mains socket, so that the power supply module 40 can be connected to the mains socket.

In this embodiment, the adapter assembly 51 includes a third housing 42, an adapter circuit board 511 provided in the third housing 42, and a first conductive connection portion 512. The first conductive connection portion 512 is electrically connected to the adapter circuit board 511.

The third housing 42 is provided with an insertion port 421, and the insertion port 421 is communicated with the inside of the third housing 42. The adapter circuit board 511 is provided inside the third housing 42 and corresponds to the insertion port 421. The first conductive connection portion 512 of this embodiment is in the structure of a pin 5121. An end of the first conductive connection portion 512 is connected to the adapter circuit board 511, and another end of the first conductive connection portion 512 protrudes toward the insertion port 421.

In this embodiment, there are two first conductive connection portions 512, and the two first conductive connection portions 512 are provided at intervals on the adapter circuit board 511.

The third housing 42 of this embodiment is also provided with a charging port 422. The charging port 422 can be connected to electronic devices to be charged, so that the power supply module 40 can be used as a charger for other electronic devices. In addition, the adapter assembly 51 further includes a second terminal 41, and the second terminal 41 is provided at the end of the third housing 42. The second terminal 41 can be docked with the first terminal 12 of the light head module 10, so that the power supply module 40 is electrically connected to the light head module 10. The second terminal 41 includes a plurality of connection grooves 411 provided at intervals.

Further, in this embodiment, the power adapter 52 includes a second conductive connection portion 521 and a plug connector 523 connected to the second conductive connection portion 521. The second conductive connection portion 521 is provided with a plug-in slot 5211, and the first conductive connection portion 512 can be inserted into the plug-in slot 5211 to realize electrical connection. Two plug-in slots 5211 corresponding to the first conductive connection portion 512 are provided in the second conductive connection portion 521.

In other examples of the application, the first conductive connection portion 512 can be a plug-in slot 5211 opened on the adapter circuit board 511, the second conductive connection portion 521 is a structure of a pin 5121 protruding from the power adapter 52, and the first conductive connection portion 512 can be inserted into the plug-in slot 5211 for electrical connection.

Or, the first conductive connection portion 512 is a bump structure protruding from the adapter circuit board 511, and the second conductive connection portion 521 is a recessed structure provided on the power adapter 52. The first conductive connection portion 512 can be in contact and docking with the second conductive connection portion 521 to realize electrical connection.

Or, the first conductive connection portion 512 is a recessed structure recessed on the adapter circuit board 511, and the second conductive connection portion 521 is a bump structure protruding from the power adapter 52. The first conductive connection portion 512 can be in contact and docking with the second conductive connection portion 521 to realize electrical connection.

In this embodiment, the plug connector 523 includes a plug main body 5231 and a connection head protruding from an end of the plug main body 5231. The second conductive connection portion 521 is provided at an end of the plug main body 5231 away from the connection head. The power adapter 52 further includes a connection line 5233, and the connection head is connected to the second conductive connection portion 521 through the connection line 5233 to realize electrical connection.

In this embodiment, there are two connection heads 5232, and the two connection heads 5232 are provided at intervals on the end surface of the plug main body 5231. The two connection heads 5232 are respectively connected to the two plug-in slots 5211 of the second conductive connection portion 521 through a connection line 5233.

When the second conductive connection portion 521 is docked with the first conductive connection portion 512, the second conductive connection portion 521 extends into the inside of the third housing 42 through the insertion port 421 to be docked with the first conductive connection portion 512, so that the power adapter 52 and the adapter assembly 51 are connected to form the power supply module 40. The convex edge of the inner wall of the third housing 42 can limit the second conductive connection portion 521 to ensure the stable docking of the first conductive connection portion 512 and the second conductive connection portion 521.

When the power supply module 40 needs to be docked with a mains socket, the power adapter 52 with the plug connector 523 is selected to be docked with the adapter assembly 51. After the second conductive connection portion 521 is docked with the first conductive connection portion 512, the power adapter 52 with the plug connector 523 can be connected to the adapter assembly 51, so that the power supply module 40 can be used for the connection of the socket mains socket and ensure the power supply of the mains socket to the light head module 10.

In addition, the power supply modules 40 with the above different structural forms can all be detachably connected with the light head module 10, so that the photographic and video light 100 can be disassembled into the optical module 20, the light head module 10, and the power supply module 40 to reduce the volume and occupied space of the photographic and video light 100, thereby facilitating the carrying and transportation of the photographic and video light 100 by users when going out.

To sum up, this setting enables the photographic and video light 100 to be disassembled into three parts: the light head module 10, the optical module 20, and the power supply module 40, and the light head module 10 and the optical module 20 have no battery compartment structure. In practical use, the photographic and video light 100 can be disassembled into three parts. Since the light head module 10 and the optical module 20 are small in size, the occupied space of the photographic and video light 100 is reduced, thereby facilitating the carrying and transportation of the photographic and video light 100, and the photographic and video light 100 can be quickly installed through the quick disassembly and installation structure to ensure the normal use of the photographic and video light 100 and the user experience.

Although the present application is described with reference to several typical embodiments, it should be understood that the terms used are illustrative and exemplary rather than restrictive. Since the present application can be embodied in many forms without departing from the spirit or substance of the present application, it should be understood that the above embodiments are not limited to any of the foregoing details but should be widely interpreted within the spirit and scope defined by the appending claims. Therefore, all changes and modifications falling within the scope of the claims or their equivalents should be covered by the appending claims.

What is claimed is:

1. A photographic and video light, comprising:
a light head module, comprising a first housing and a light source assembly, wherein an end of the first housing is an open end, and an end of the first housing opposite to the open end is set as an installation end, the light source assembly is provided in the first housing, and light emitted by the light source assembly is emitted from the open end of the first housing;
an optical module, comprising a second housing and a light effect lens provided inside the second housing, wherein the second housing is provided at the open end of the first housing, two ends of the second housing are a light inlet and a light outlet respectively, the light emitted by the light source assembly enters the second housing from the light inlet and is emitted from the light outlet through the light effect lens; and
a power supply module, comprising a third housing, wherein an end of the third housing is detachably connected to the installation end of the first housing, and when an end of the third housing is docked with the installation end of the light head module, the power supply module is electrically connected to the light head module for supplying power to the light source assembly, and the first housing, the second housing, and the third housing form a complete housing of the photographic and video light;
wherein the power supply module comprises an adapter assembly and a power adapter connected with the adapter assembly;
the adapter assembly is provided in the third housing and comprises an adapter circuit board and a first conductive connection portion, and the first conductive connection portion is electrically connected with the adapter circuit board; and
the power adapter is configured for connecting with an external commercial power, an end of the power adapter is provided with a second conductive connection portion, the second conductive connection portion is detachably and electrically connected with the first conductive connection portion, and the power supply module is connected to a light holder or a commercial power socket to supply power to the light head module.

2. The photographic and video light according to claim 1, wherein a snap or a snap slot is provided at the installation end of the first housing, and a snap slot or a snap is provided at the end of the third housing, and when the snap of the power supply module is snapped in the snap slot of the light head module, or the snap of the light head module is snapped in the snap slot of the power supply module, the light head module and the power supply module are detachably docked.

3. The photographic and video light according to claim 2, wherein the snap is provided at the installation end of the first housing, and the snap is movable in a first direction relative to the first housing to disengage from the snap slot of the third housing;
the light head module further comprises a pressure plate and a pusher, and the pressure plate is provided inside the first housing, an end of the snap is fixed on the pressure plate, and another end of the snap protrudes from the first housing for snapping with the snap slot;
an end of the pusher abuts against an end of the pressure plate, and another end of the pusher protrudes from the first housing; and
the pusher is pushed to move in a second direction perpendicular to the first direction, the end of the pusher pushes the pressure plate to move in the first direction, to make the snap disengage from the snap slot.

4. The photographic and video light according to claim 3, wherein an end surface of the pressure plate for abutting against the pusher is a first inclined surface, and an end surface of the pusher for abutting against the pressure plate is a second inclined surface; and
the first inclined surface is attached to the second inclined surface, and when the pusher moves in the second direction, the second inclined surface moves along the first inclined surface to push the pressure plate to move in the first direction.

5. The photographic and video light according to claim 4, wherein the light head module further comprises a spring fixed inside the first housing, and a first end of the spring abuts against the pressure plate, and the spring is configured to elastically expand and contract;
when the pusher moves in the second direction, the pressure plate presses the spring to make the spring in a compressed state, and when the snap moves in the first direction to a first working position, the snap disengages from the snap slot; and the spring elastically extends, and the spring abuts against the pressure plate to make the pressure plate move in a direction opposite to the first direction, to make the snap move to a second working position, and the snap at the second working position is snapped with the snap slot.

6. The photographic and video light according to claim 2, wherein the light head module further comprises at least two flanges spaced apart and protruding from the first housing, an inner wall of each flange and an end surface of the first housing enclose to form the installation end, and the snap is provided between two flanges;

the power supply module comprises a fixing portion protruding from the end of the third housing, an edge of an end surface of the third housing extends outward beyond the fixing portion, and the snap slot is opened in the fixing portion; and the fixing portion is detachably accommodated in the first housing, and an end of each flange abuts against the edge of the end surface of the third housing.

7. The photographic and video light according to claim 1, wherein the light head module further comprises a first magnet provided at the installation end, and the power supply module further comprises a second magnet provided inside the third housing corresponding to the end of the power supply module; and the power supply module is detachably provided at the installation end by magnetic fixing of the first magnet and the second magnet.

8. The photographic and video light according to claim 1, wherein the light head module further comprises a first terminal provided on the first housing, and the power supply module comprises a second terminal;

when the power supply module is connected to the light head module, the second terminal is docked and electrically connected with the first terminal, to make the power supply module supplies power to the light head module; and wherein the power supply module comprises a battery provided in the third housing, and the end of the third housing is detachably connected to the installation end.

9. The photographic and video light according to claim 8, wherein the first terminal comprises a plurality of connection pieces spaced apart, the second terminal comprises a plurality of connection grooves spaced apart, and the plurality of connection pieces are correspondingly inserted into the plurality of connection grooves one by one, to make the power supply module electrically connect with the light source assembly.

10. The photographic and video light according to claim 1, wherein the end of the second housing provided with the light inlet is detachably provided at the open end, so that the light emitted by the light source assembly passes through the light effect lens to generate a light effect and then is emitted from the light outlet.

11. The photographic and video light according to claim 10, further comprising a connection assembly, wherein the connection assembly comprises a first connection portion provided on an outer side of the first housing and a second connection portion provided on an outer side of the second housing; and when the end of the second housing is docked with the end of the first housing, the first connection portion is adaptively connected with the second connection portion.

12. The photographic and video light according to claim 11, wherein the first connection portion movably penetrates through a side wall of the first housing, the first connection portion is movable along a radial direction of the first housing, the first connection portion is configured as a pin, the second connection portion is recessed on the outer side of the second housing to form a groove, the groove extends along an axial direction of the second housing, and the pin is movable along an extension direction of the groove to make the optical module move in an axial direction of the light head module.

13. The photographic and video light according to claim 12, wherein the connection assembly further comprises an elastic member and a disassembly hole provided on the second housing;

the pin is provided between the first housing and the pin, when not subjected to external force, the pin remains in a state of protruding from the outer side of the first housing; and the disassembly hole radially penetrates through a side wall of the second housing, and an external thimble passes through the disassembly hole to abut against a top end of the pin, to drive the pin to move inward along the radial direction of the first housing, to make the top end of the pin flush with the outer side of the first housing.

14. The photographic and video light according to claim 12, wherein the first connection portion is a thread flange, and the second connection portion is a spiral groove;

the thread flange extends outward from the outer side of the first housing along a radial direction of the first housing, and the spiral groove is recessed on an inner side of the second housing and extends toward an axial direction of the second housing; and an outer end of the thread flange is extendable into the spiral groove and move relatively in the spiral groove to make the optical module move in an axial direction of the light head module.

15. The photographic and video light according to claim 1, wherein the end of the second housing provided with the light inlet is movably sleeved on the open end, to make second housing movable along an axial direction of the first housing, to make the light effect lens far away from or close to the light source assembly.

16. The photographic and video light according to claim 1, wherein the first conductive connection portion is a pin structure, the second conductive connection portion is provided with a plug-in slot, and the first conductive connection portion is inserted into the plug-in slot for electrical connection; or the first conductive connection portion is a plug-in slot opened on the adapter circuit board, the second conductive connection portion is a pin structure protruding from the power adapter, and the first conductive connection portion is plugged into the plug-in slot for electrical connection.

17. The photographic and video light according to claim 1, wherein the first conductive connection portion is a bump structure protruding from the adapter circuit board, and the second conductive connection portion is a recessed structure provided on the power adapter; or the first conductive connection portion is a recessed structure recessed on the adapter circuit board, and the second conductive connection portion is a bump structure protruding from the power adapter; and the first conductive connection portion is in contact with the second conductive connection portion to achieve electrical connection.

18. The photographic and video light according to claim 1, wherein an end of the power adapter opposite to the second conductive connection portion is set as a light holder connector for connecting with the light holder, or an end of the power adapter opposite to the second conductive connection portion is set as a plug connector for connecting with the commercial power socket;

the second conductive connection portion is detachably docked with the first conductive connection portion, so that the light holder connector and the plug connector are replaceably connected to the adapter assembly; and when the light holder connector is connected with the light holder or the plug connector is connected with the commercial power socket, the power supply module is connected to the light holder or the commercial power socket to supply power to the light head module through external commercial power.

19. The photographic and video light according to claim 18, wherein the light holder connector comprises a connector main body and a thread portion provided on an outer circumference of the connector main body, and the second conductive connection portion is provided at an end of the connector main body; or the plug connector comprises a plug main body and a connection head protruding from an end of the plug main body, and the second conductive connection portion is provided at an end of the plug main body opposite to the power adapter; and the power adapter further comprises a connection line, and the power adapter is connected with the second conductive connection portion through the connection line.

* * * * *